United States Patent [19]

Day et al.

[11] Patent Number: 5,974,475

[45] Date of Patent: Oct. 26, 1999

[54] METHOD FOR FLEXIBLE MULTIPLE ACCESS ON A SERIAL BUS BY A PLURALITY OF BOARDS

[75] Inventors: John Day, Marlboro, Mass.; Nathan John, Chandler, Ariz.; Bruce Negley, Phoenix, Ariz.; Shannon Poulin, Tempe, Ariz.

[73] Assignee: Microchip Technology Incorporated, Chandler, Ariz.

[21] Appl. No.: 08/881,757

[22] Filed: Jun. 24, 1997

[51] Int. Cl.[6] .................................................... G06F 13/00
[52] U.S. Cl. ...................................................... 710/9; 710/8
[58] Field of Search ........................... 395/829; 710/8–14

[56] References Cited

U.S. PATENT DOCUMENTS

| | | | |
|---|---|---|---|
| 4,773,005 | 9/1988 | Sullivan | 395/829 |
| 5,655,148 | 8/1997 | Richman et al. | 395/829 |
| 5,675,830 | 10/1997 | Satula | 395/829 |
| 5,787,306 | 7/1998 | Michael | 395/829 |
| 5,799,203 | 8/1998 | Lee et al. | 395/829 |

*Primary Examiner*—Ayaz R. Sheikh
*Assistant Examiner*—David A. Wiley
*Attorney, Agent, or Firm*—Frohwitter; Paul N. Katz; Ronald L. Chichester

[57] ABSTRACT

A method for allowing flexible multiple access to a serial bus by a plurality of circuit boards. Before a circuit board can be used on a common serial bus with other circuit boards, a unique software address must be assigned to each circuit board. The unique software address is assigned by having a bus master device issue Assign Address commands which utilizes a unique serial number which is stored on each circuit board. The Assign Address command queries each of the circuit boards coupled to the serial bus and assigns a unique software address to each circuit board that fully responds. The Assign Address command is repeated for each circuit board on the serial bus until all of the circuit boards on the serial bus have been assigned a unique software address.

9 Claims, 1 Drawing Sheet

5,974,475

METHOD FOR FLEXIBLE MULTIPLE ACCESS ON A SERIAL BUS BY A PLURALITY OF BOARDS

BACKGROUND OF THE INVENTION

1. Field of the Invention

This invention relates generally to serial busses and, more specifically, to a method for allowing multiple access to the serial bus by a plurality of circuit boards.

2. Description of the Prior Art

Popular serial communication protocols in current usage have two methods of addressing individual boards in a system: (1) Individual Chip Select, and (2) Software Addressing. Both of the above methods have potential down sides. When using an individual chip select method, every board on the serial bus is directly connected to an individual chip select line. This creates a high burden in terms of board area devoted to the individual chip select lines. This burden goes up as the number of boards on the bus increases. When using software addressing, there is a limited number of bits (i.e., three) that are reserved for addressing individual boards. This limits the total number of circuit boards that may exist on the same bus to eight. Both of the above methods also have the limitation that all the addressing must be set and in place at the time the system is designed. This prohibits designing a flexible system where circuit boards may be swapped within the system.

Therefore, a need existed to provide an improved method for allowing identification of circuit boards in a system. The method must allow for identification of circuit boards in systems having only a few to an infinite number of circuit boards. The method will allow for flexible multiple access to a serial bus by a plurality of circuit boards. The method will also allow for easy hot plugging of circuit boards on the serial bus.

SUMMARY OF THE INVENTION

In accordance with one embodiment of the present invention, it is an object of the present invention to provide an improved method for allowing identification of circuit boards in a system.

It is another object of the present invention to provide an improved method which will allow for the identification of circuit boards in systems having only a few to an infinite number of circuit boards.

It is still another object of the present invention to provide an improved method which will allow for flexible multiple access to a serial bus by a plurality of circuit boards.

It is yet another object of the present invention to provide a method which will allow for easy hot plugging of circuit boards on a serial bus.

BRIEF DESCRIPTION OF THE PREFERRED EMBODIMENTS

In accordance with one embodiment of the present invention, a method for allowing flexible multiple access to a serial bus by a plurality of circuit boards. The method comprises the steps of: providing at least two circuit boards wherein each of the at least two circuit boards have a unique serial number and a register for storing address data; providing a serial bus coupled to the at least two circuit boards for transferring data to and from the at least two circuit boards; and providing a bus master device coupled to the serial bus for initiating data transfers on the serial bus to the at least two circuit boards; and assigning a unique software address to each of the at least two circuit boards to allow the bus master device to perform data transfers to each of the at least two circuit boards, each of the at least two circuit boards responding only to commands containing a unique software address which is individually related to that particular circuit board.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
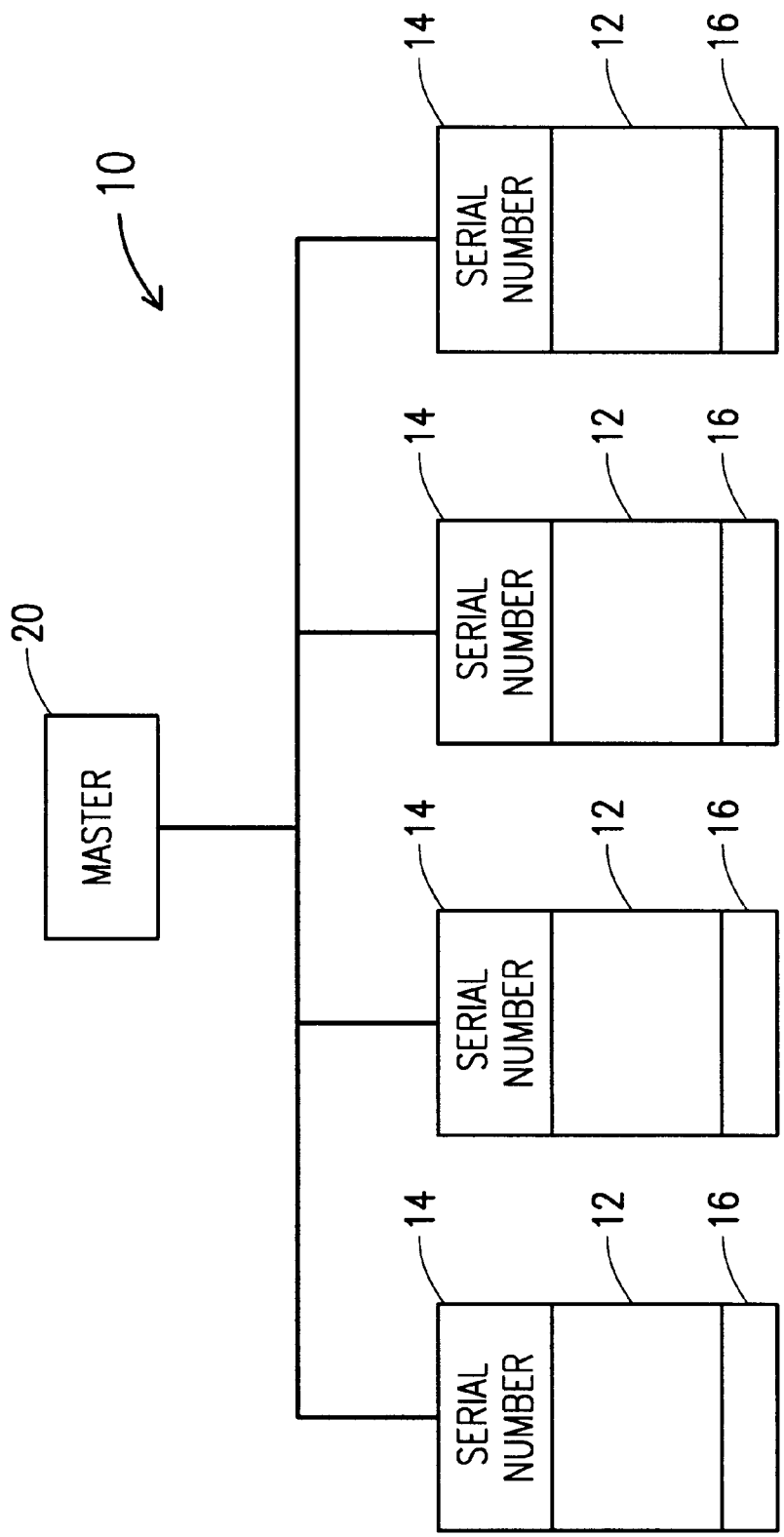
FIG. 1 is a simplified functional block diagram of a system used for transferring data which will benefit from implementing the method of the present invention.

Referring to FIG. 1, a system 10 is shown. The system 10 has a plurality of circuit boards 12. Each of the circuit boards 12 is loaded with a serial number which is stored in a non-volatile serial number register 14. The serial number is a unique number which is used to identify a particular circuit board 12. Although all the circuit boards 12 may be of the same type, each circuit board 12 has a unique serial number. In the preferred embodiment of the present invention, the serial number is a forty-eight (48) bit serial number and is loaded by the manufacturer. The serial number cannot be changed by the end user. The serial number is used during powerup of the system 10 to assign each circuit board 12 a unique software address which is stored in an address register 16. The unique software address is used for all standard read and write commands to that specific circuit board 12.

Each of the circuit boards 12 are coupled to a serial bus 18. The serial bus 18 is used for transferring data to and from each of the circuit boards 12. In the preferred embodiment of the present invention, the serial bus is compatible with Inter-Integrated Circuit ($I^2C$) bus protocol.

An $I^2C$ bus is a low speed serial bus which is designed to support any integrated circuit (IC) fabrication process (i.e., NMOS, CMOS, bipolar, etc.). The $I^2C$ bus is comprised of two signal lines, a serial data line and a serial clock line, which carries information between the circuit boards 12 (i.e., each circuit board 12 comprising a plurality of IC devices such as microcontroller, LCD driver, memory, keyboard interface, etc.) which are coupled to the $I^2C$ bus. Each circuit board 12 on the $I^2C$ bus is recognized by its unique software address and can operate as a transmitter or a receiver depending on the function of the circuit board 12.

A bus master device 20 is also coupled to the serial bus 18. The bus master device 20 is used for initiating data transfers on the serial bus 18. The bus master device 20 further generates the clock signals to permit the data transfers.

If there are multiple circuit boards 12 on the serial bus 18, each circuit board 12 must be assigned a unique software address before communication of data within the circuit board may begin. As stated above, each circuit board 12 contains an address register 16 which holds a unique software address. In the preferred embodiment of the present invention, the software address is an eight (8) bit identification address byte. All read and write commands to a specific circuit boards 12 include the identification address byte of that particular circuit board 12.

Upon power up, the address register 16 of each of the plurality of circuit boards 12 will be initializing to a default location. In the preferred embodiment of the present invention, each of the plurality of circuit boards 12 is initialized to a default address location of 00h. Communication with a circuit board 12 using the default address location is typically done only at testing or programming of the circuit board 12 and not when more than one circuit board 12 is coupled to the serial bus 18. Before a circuit board 12 can be used on a common serial bus 12 with other circuit boards 12, a unique software address must be assigned to every circuit board.

The unique software address is assigned by having the bus master device 20 issue Assign Address commands which utilizes the unique serial number which is stored on each circuit board 12. The Assign Address command queries each of the circuit boards 12 coupled to the serial bus 18 and assigns a unique software address to each circuit board that responds. The Assign Address command must be repeated for each circuit board 12 on the serial bus 18 until all of the circuit boards 12 have been assigned a unique software address.

When an Assign Address command is sent by the bus master device 20, each of the circuit boards 12 on the serial bus 18 will begin to transmit its unique serial number. As each bit of the serial address is clocked out, each circuit board 12 will monitor the serial bus 18 to detect if another circuit board 12 is also transmitting its unique serial number. If a circuit board 12 is outputting a logic '1' on the serial bus 18 and it detects that the serial bus 18 is at a logic '0', the circuit board 12 assumes that another circuit board 12 is controlling the serial bus 18. As soon as any circuit board 12 detects that it is not controlling the bus, that circuit board 12 will immediately stop transmitting its unique serial number and return to a standby mode. If a circuit board 12 transmits its entire serial number without releasing the serial bus 18 to another circuit board 12, then the unique software address transmitted within the command is transferred to the address register 16 within this circuit board 12 that fully responds. This particular circuit board 12 will now respond only to commands that contain this unique software address. Once a circuit board 12 has been assigned a unique software address, it will no longer respond to Assign Address commands until power is cycled or a Clear Address command is sent.

This process is repeated by the bus master device 20 until none of the circuit boards 12 respond to the Assign Address command. At this point, all circuit boards 12 on the serial bus 18 have been assigned a unique software address and standard read write commands can be executed to each individual circuit board 12 using its own unique software address.

Each unique software address is stored in a volatile memory address register 16 of each circuit board 12. If power is removed from the circuit board 12 or a Clear Address command is sent, the process of assigning a unique software address must be repeated.

While the invention has been particularly shown and described with reference to preferred embodiments thereof, it will be understood by those skilled in the art that the foregoing and other changes in form, and details may be made therein without departing from the spirit and scope of the invention.

We claim:

1. A method for allowing flexible multiple access to a serial bus by a plurality of circuit boards comprising the steps of:

providing at least two circuit boards wherein each of said at least two circuit boards have a unique serial number and a register for storing address data;

providing a serial bus coupled to each of said at least two circuit boards for transferring said data to each of said at least two circuit boards; and providing a bus master device coupled to said serial bus for initiating data transfers on said serial bus to each of said at least two circuit boards; and assigning a unique software address to each of said at least two circuit boards to allow said bus master device to perform said data transfers to each of said at least two circuit boards, each of said at least two circuit boards responding only to commands containing said unique software address which are individually related to each of said at least two circuit boards, wherein said step of assigning said unique software addresses to each of said at least two circuit boards further comprises the steps of:

sending Assign Address commands by said bus master device to query each of said circuit boards;

assigning said unique software address to each of said at least two circuit boards that fully responds; and continuing to send said Assign Address commands by said bus master device to query each of said at least two circuit boards until each of said two circuit boards coupled to said serial bus that fully responds and is assigned said unique software address which is individually related to each of said at least two circuit boards, wherein said step of assigning said unique software address to each of said at least two circuit boards that fully responds further comprises the steps of:

transmitting said unique serial number by each of said at least two circuit boards coupled to said serial bus in response to said sending of said Assign Address commands by said bus master device to query each of said circuit boards;

monitoring said serial bus by each of said at least two circuit boards coupled to said serial bus to detect if another circuit board of said at least two circuit boards is controlling said serial bus; and transferring said unique software address to said register of a first one of said at least two circuit boards that fully transmits an entire unique serial number without releasing said serial bus to another one of said at least two circuit boards.

2. A method for allowing flexible multiple access to a serial bus by a plurality of circuit boards in accordance with claim 1 further comprising the step of initializing said address register of each of said at least two circuit boards to a default location.

3. A method for allowing flexible multiple access to a serial bus by a plurality of circuit boards in accordance with claim 1 further comprising the step of discontinuing transmitting said unique serial number in response to sending of said Assign Address commands by said bus master device by each of said at least two circuit boards coupled to said serial bus that has been assigned said unique software address.

4. A method for allowing flexible multiple access to a serial bus by a plurality of circuit boards in accordance with claim 3 wherein said step of discontinuing transmitting said unique serial number in response to sending of said Assign Address commands by said bus master device further comprises the step of discontinuing transmitting said unique serial number in response to sending of said Assign Address commands by said bus master device by each of said at least two circuit boards coupled to said serial bus that has been assigned said unique software address until at least one of power is cycled and a Clear Address command is sent.

5. A method for allowing flexible multiple access to a serial bus by a plurality of circuit boards in accordance with claim 1 wherein said step of monitoring said serial bus by each of said at least two circuit boards coupled to said serial bus to detect if another circuit board of said at least two circuit boards is controlling said serial bus further comprises the steps of:

discontinuing transmitting said unique serial number by each of said at least two circuit boards once each of said at least two circuit boards detects that another one of said at least two circuit boards is controlling said serial bus; and returning to a standby mode.

6. A method for allowing flexible multiple access to a serial bus by a plurality of circuit boards comprising the steps of:

providing at least two circuit boards wherein each of said at least two circuit boards have a unique serial number and a register for storing address data;

providing a serial bus coupled to each of said at least two circuit boards for transferring said data to each of said at least two circuit boards; and providing a bus master device coupled to said serial bus for initiating data transfers on said serial bus to each of said at least two circuit boards;

sending Assign Address commands by said bus master device to query each of said circuit boards;

assigning a unique software address to each of said at least two circuit boards that fully responds to allow said bus master device to perform said data transfers to each of said at least two circuit boards, each of said at least two circuit boards responding only to commands containing said unique software address which are individually related to each of said at least two circuit boards, said step of assigning a unique software address further comprising the steps of:

transmitting said unique serial number by each of said at least two circuit boards coupled to said serial bus in response to said sending of said Assign Address commands by said bus master device to query each of said circuit boards;

monitoring said serial bus by each of said at least two circuit boards coupled to said serial bus to detect if another circuit board of said at least two circuit boards is controlling said serial bus; and transferring said unique software address to said register of a first one of said at least two circuit boards that fully transmits an entire unique serial number without releasing said serial bus to another one of said at least two circuit boards;

discontinuing transmitting said unique serial number in response to sending of said Assign Address commands by said bus master device by each of said at least two circuit boards coupled to said serial bus that has been assigned said unique software address; and continuing to send said Assign Address commands by said bus master device to query each of said at least two circuit boards until each of said two circuit boards coupled to said serial bus that fully responds and is assigned said unique software address which is individually related to each of said at least two circuit boards.

7. A method for allowing flexible multiple access to a serial bus by a plurality of circuit boards in accordance with claim 6 further comprising the step of initializing said address register of each of said at least two circuit boards to a default location.

8. A method for allowing flexible multiple access to a serial bus by a plurality of circuit boards in accordance with claim 6 wherein said step of discontinuing transmitting said unique serial number in response to sending of said Assign Address commands by said bus master device further comprises the step of discontinuing to transmitting said unique serial number in response to sending of said Assign Address commands by said bus master device by each of said at least two circuit boards coupled to said serial bus that has been assigned said unique software address until at least one of power is cycled and a Clear Address command is sent.

9. A method for allowing flexible multiple access to a serial bus by a plurality of circuit boards in accordance with claim 6 wherein said step of monitoring said serial bus by each of said at least two circuit boards coupled to said serial bus to detect if another circuit board of said at least two circuit boards is controlling said serial bus further comprises the steps of:

discontinuing transmitting said unique serial number by each of said at least two circuit boards once each of said at least two circuit boards detects that another one of said at least two circuit boards is controlling said serial bus; and returning to a standby mode.

* * * * *